United States Patent
Ahn et al.

(10) Patent No.: US 9,848,395 B2
(45) Date of Patent: *Dec. 19, 2017

(54) METHOD FOR CONTROLLING UPLINK TRANSMISSION POWER AND WIRELESS DEVICE USING SAME

(71) Applicant: LG ELECTRONICS INC., Seoul (KR)

(72) Inventors: Joon Kui Ahn, Anyang-si (KR); Su Hwan Lim, Anyang-si (KR); Suck Chel Yang, Anyang-si (KR); Dong Youn Seo, Anyang-si (KR)

(73) Assignee: LG Electronics Inc., Seoul (KR)

(*) Notice: Subject to any disclaimer, the term of this patent is extended or adjusted under 35 U.S.C. 154(b) by 85 days.

This patent is subject to a terminal disclaimer.

(21) Appl. No.: 14/978,649

(22) Filed: Dec. 22, 2015

(65) Prior Publication Data

US 2016/0112968 A1  Apr. 21, 2016

Related U.S. Application Data

(63) Continuation of application No. 14/374,168, filed as application No. PCT/KR2013/000693 on Jan. 29, 2013, now Pat. No. 9,247,503.

(Continued)

(51) Int. Cl.
*H04L 1/00* (2006.01)
*H04W 52/34* (2009.01)
(Continued)

(52) U.S. Cl.
CPC ......... *H04W 52/34* (2013.01); *H04W 52/146* (2013.01); *H04W 52/283* (2013.01);
(Continued)

(58) Field of Classification Search
CPC .... H04L 1/0002; H04L 1/20; H04W 36/0083; H04W 36/0088; H04W 36/0094;
(Continued)

(56) References Cited

U.S. PATENT DOCUMENTS 9,008,050 B2  4/2015  Feuersanger ....... H04W 52/281
                                                            370/336
2011/0223932 A1  9/2011  Hole et al.
(Continued)

FOREIGN PATENT DOCUMENTS

KR  1020120139820 A  12/2012
WO  2011116242 A1  9/2011

OTHER PUBLICATIONS

3GPP TSG RAN WG1 Meeting #67, "Issues on UL Simultaneous Transmission for Multiple TA", Nov. 14-18, 2011, p. 1-3.
(Continued)

*Primary Examiner* — Dady Chery
(74) *Attorney, Agent, or Firm* — Dentons US LLP

(57) ABSTRACT

The present invention relates to a method for controlling uplink transmission power and to a wireless device using same in a wireless communication system. The wireless device receives determines uplink transmission power in consideration of the overlap period between subframes between a first serving cell belonging to a first timing advance (TA) group and a second serving cell belonging to the second TA group, and transmits an uplink channel on the basis of the uplink transmission power.

10 Claims, 12 Drawing Sheets

Related U.S. Application Data

(60) Provisional application No. 61/591,968, filed on Jan. 29, 2012.

(51) Int. Cl.
*H04W 52/14* (2009.01)
*H04W 52/28* (2009.01)
*H04W 52/38* (2009.01)
*H04W 72/04* (2009.01)
*H04W 56/00* (2009.01)

(52) U.S. Cl.
CPC ....... *H04W 52/38* (2013.01); *H04W 72/0413* (2013.01); *H04W 72/0473* (2013.01); *H04W 56/0045* (2013.01)

(58) Field of Classification Search
CPC . H04W 28/0257; H04W 28/04; H04W 72/04; H04W 72/12; H04W 76/00; H04B 7/2121; H04B 7/2123; H04B 7/2615; H04J 2203/0069; H04Q 2213/394
USPC ............... 370/310, 328, 329, 336, 343, 345; 455/522, 69, 68, 524, 525, 500, 517, 455/422.1, 403, 403.1
See application file for complete search history.

(56) References Cited

U.S. PATENT DOCUMENTS

2011/0228680 A1 9/2011 Ball et al.
2011/0243111 A1 10/2011 Andgart et al.

OTHER PUBLICATIONS

3GPP TSG RAN WG1 Meeting #68, "LS on Simultaneous Transmission of PUSCH/PUCCH/SRS for Multiple TA", Feb. 6-10, 2012, p. 1-2.
3GPP TSG RAN WG1 Meeting #58AH, "Further Discussion on Pcmax, c and Pcmax", Apr. 11-15, 2011, p. 1-6.

METHOD FOR CONTROLLING UPLINK TRANSMISSION POWER AND WIRELESS DEVICE USING SAME

This application is a Continuation of U.S. application Ser. No. 14/374,168 filed Jul. 23, 2014, which is a National Stage under 35 U.S.C. 371 of International Application No. PCT/KR2013/000693 filed Jan. 29, 2013, which claims the benefit of U.S. Provisional Application No. 61/591,968 filed Jan. 29, 2012, all of which are hereby incorporated by reference in their entirety.

BACKGROUND OF THE INVENTION

Field of the invention

The present invention relates to wireless communications, and more particularly, to a method of controlling an uplink transmit power in a wireless communication system, and a wireless device using the method.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As described in 3GPP TS 36.211 V8.7.0 (2009-05) "Evolved Universal Terrestrial Radio Access (E-UTRA); Physical Channels and Modulation (Release 8)", in 3GPP LTE/LTE-A, a physical channel can be divided into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

To decrease interference caused by uplink transmission between user equipments (UEs), it is important for a base station (BS) to maintain an uplink time alignment of the UEs. The UE may be located in any area in a cell. An uplink signal transmitted by the UE may arrive to the BS at a different time according to the location of the UE. A signal arrival time of a UE located in a cell edge is longer than a signal arrival time of a UE located in a cell center. On the contrary, the signal arrival time of the UE located in the cell center is shorter than the signal arrival time of the UE located in the cell edge.

To decrease the interference between the UEs, the BS needs to perform scheduling so that uplink signals transmitted by the UEs in the cell can be received every time within a boundary. The BS has to properly adjust transmission timing of each UE according to a situation of each UE. Such an adjustment is called an uplink time alignment. A random access process is one of processes for maintaining the uplink time alignment. The UE acquires a time alignment value (or also referred to as a timing advance (TA)) through the random access process, and maintains the uplink time alignment by applying the time alignment value.

In addition, a transmit power of the UE needs to be adjusted to mitigate an interference caused by uplink transmission. It is difficult for the BS to receive uplink data if the transmit power of the UE is too low. If the transmit power of the UE is too high, uplink transmission may cause a significant interference to transmission of another UE.

Recently, multiple serving cells are introduced to provide a higher data rate. However, the same time alignment value has been applied to all serving cells under the assumption that serving cells have adjacent frequencies or have similar propagation properties.

A method capable of regulating an uplink transmit power among a plurality of serving cells is required when configuring the plurality of serving cells to which different time alignment values are applied.

SUMMARY OF THE INVENTION

The present invention provides a method of controlling an uplink transmit power among a plurality of serving cells, and a wireless device using the method.

In an aspect, a method for controlling an uplink transmit power in a wireless communication system is provided. The method includes receiving, by a wireless device, a configuration regarding first and second timing advance (TA) groups from a base station, determining, by the wireless device, an uplink transmit power by considering an overlapping duration between subframes for a first serving cell belonging to the first TA group and a second serving cell belonging to the second TA group, and transmitting, by the wireless device, an uplink channel based on the uplink transmit power.

The overlapping duration may include a first overlapping duration in which a portion of a subframe n of the first serving cell overlaps with a subframe n of the second serving cell, and a second overlapping duration in which the remaining portions of the subframe n of the first serving cell overlaps with a subframe n−1 or subframe n+1 of the second serving cell.

In another aspect, a wireless device for controlling an uplink transmit power in a wireless communication system is provided. The wireless device includes a radio frequency (RF) unit configured to transmit and receive a radio signal, and a processor operatively coupled to the RF unit and configured to instruct the RF unit to receive a configuration regarding first and second timing advance (TA) groups from a base station, determine an uplink transmit power by considering an overlapping duration between subframes for a first serving cell belonging to the first TA group and a second serving cell belonging to the second TA group, and instruct the RF unit to transmit an uplink channel based on the uplink transmit power.

An uplink transmit power between serving cells belonging to different timing advance (TA) groups can be regulated when a plurality of TA groups are configured.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE) or 3GPP LTE-advanced (LTE-A). This is for exemplary purposes only, and the present invention is also applicable to various wireless communication systems. In the following description, LTE and/or LTE-A are collectively referred to as LTE.

Figure 1:
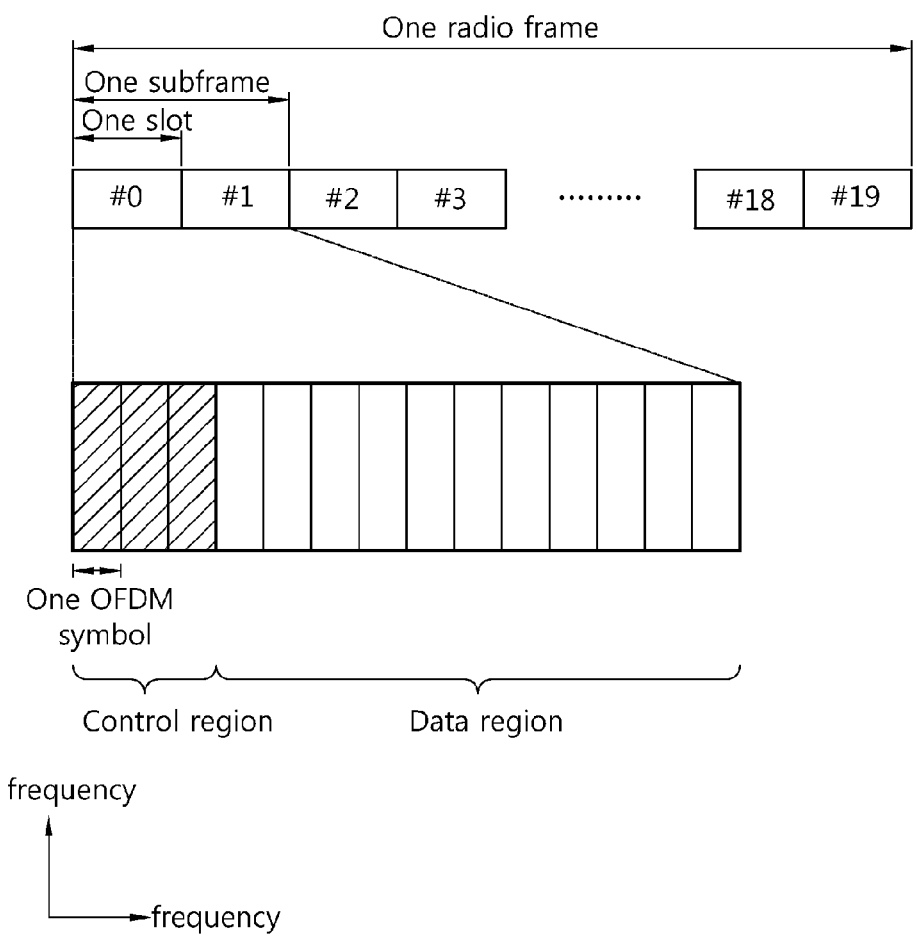
FIG. 1 shows a downlink (DL) radio frame structure in $3^{rd}$ generation partnership project (3GPP) long term evolution (LTE).

FIG. 1 shows a structure of a downlink radio frame in 3GPP LTE. The section 6 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a first OFDM symbol of the subframe carries a control format indicator (CFI) regarding the number of OFDM symbols (i.e., a size of the control region) used for transmission of control channels in the subframe. The wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

According to 3GPP TS 36.211 V8.7.0, the uplink channel includes a PUSCH, a PUCCH, a sounding reference signal (SRS), and a physical random access channel (PRACH).

The PUCCH supports multiple formats. A PUCCH having a different number of bits per subframe can be used according to a modulation scheme which is dependent on the PUCCH format. The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

Now, maintaining of a UL time alignment in 3GPP LTE will be described.

To decrease an interference caused by UL transmission between UEs, it is important for a BS to maintain a UL time alignment of the UEs. The UE may be located in any area in a cell. A UL signal transmitted by the UE may arrive to the BS at a different time according to the location of the UE. A signal arrival time of a UE located in a cell edge is longer than a signal arrival time of a UE located in a cell center. On the contrary, the signal arrival time of the UE located in the cell center is shorter than the signal arrival time of the UE located in the cell edge.

To decrease the interference between the UEs, the BS needs to perform scheduling so that UL signals transmitted by the UEs in the cell can be received every time within a boundary. The BS has to properly adjust transmission timing of each UE according to a situation of each UE. Such an adjustment is called a time alignment maintenance.

A random access procedure is one of methods for managing the time alignment. The UE transmits a random access preamble to the BS. The BS calculates a time alignment value for advancing or delaying transmission timing of the UE on the basis of the received random access preamble. In addition, the BS transmits a random access response including the calculated time alignment value to the UE. The UE updates the transmission timing by using the time alignment value.

In another method, the BS receives a sounding reference signal from the UE periodically or randomly, calculates the time alignment value of the UE by using the sounding reference signal, and reports a MAC control element (CE) to the UE.

The time alignment value is information sent by the BS to the UE to maintain uplink time alignment. A timing alignment command indicates this information.

Since the UE has a mobility in general, the transmission timing of the UE varies depending on a speed, location, or the like of the moving UE. Therefore, the time alignment value received by the UE is preferably valid during a specific time period. For this, a time alignment timer is used.

When the time alignment is updated after receiving the time alignment value from the BS, the UE starts or restarts the time alignment timer. The UE can perform UL transmission only when the time alignment timer is running. A value of the time alignment timer may be reported by the BS to the UE by using system information or an RRC message such as a radio bearer reconfiguration message.

When the time alignment timer expires or when the time alignment timer does not run, the UE does not transmit any uplink signal except for the random access preamble under the assumption that time alignment is not achieved between the BS and the UE.

Figure 2:
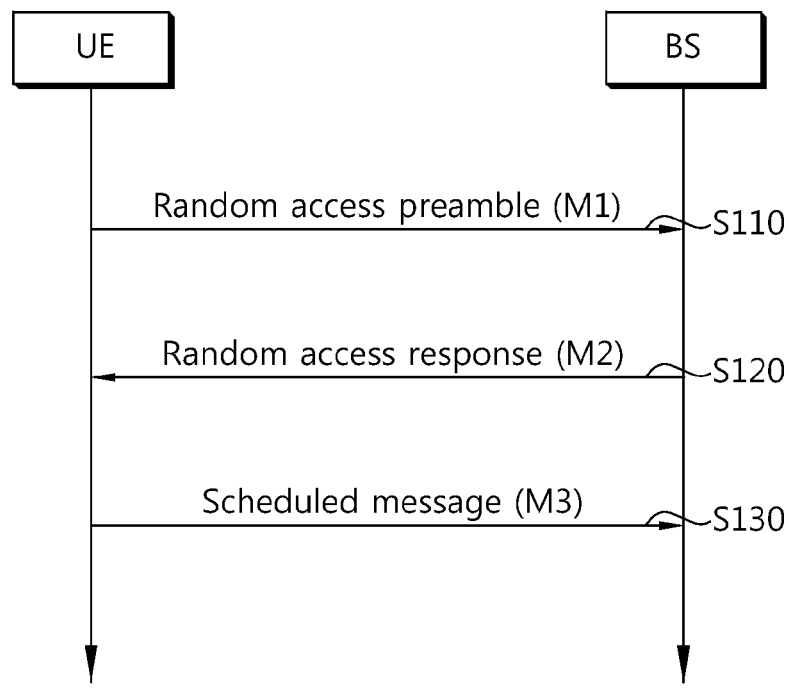
FIG. 2 is a flowchart showing a random access procedure in 3GPP LTE.

FIG. 2 is a flowchart showing a random access procedure in 3GPP LTE. The random access procedure is used by a UE to acquire a UL time alignment with a BS or to allocate a UL radio resource.

The UE receives a root index and a physical random access channel (PRACH) configuration index from the BS. Each cell has 64 candidate random access preambles defined by a Zadoff-Chu (ZC) sequence. The root index is a logical index for generating the 64 candidate random access preambles by the UE.

The random access preamble is limited to a specific time and frequency resource for each cell. The PRACH configuration index indicates a specific subframe and preamble format capable of transmitting the random access preamble.

The UE transmits a randomly selected random access preamble to the BS (step S110). The UE selects one of the 64 candidate random access preambles. In addition, the UE selects a corresponding subframe by using the PRACH configuration index. The UE transmits the selected random access preamble in the selected subframe.

Upon receiving the random access preamble, the BS transmits a random access response (RAR) to the UE (step S120). The RAR is detected in two steps. First, the UE detects a PDCCH masked with a random access-RNTI (RA-RNTI). The UE receives the RAR included in a medium access control (MAC) protocol data unit (PDU) through a PDSCH indicated by the detected PDCCH.

Figure 3:
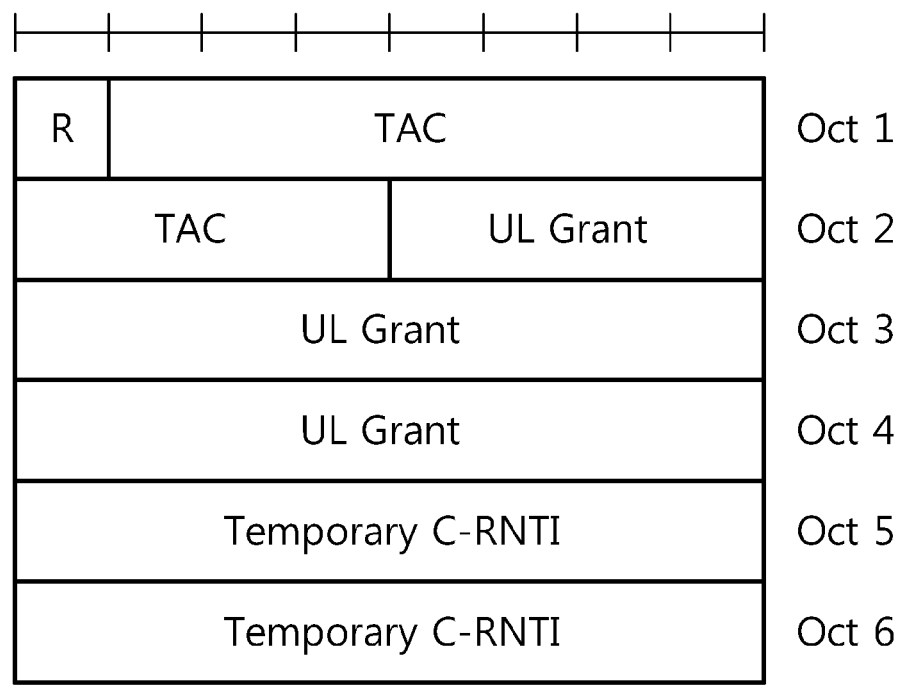
FIG. 3 shows an example of a random access response.

FIG. 3 shows an example of a random access response (RAR).

The RAR may include a TAC, a UL grant, and a temporary C-RNTI.

The TAC is information indicating a time alignment value sent by a BS to a UE to maintain a UL time alignment. The UE updates UL transmission timing by using the time alignment value. When the UE updates the time alignment, a time alignment timer starts or restarts.

The UL grant includes a UL resource assignment and a transmit power command (TPC) used to transmit a scheduling message described below. The TPC is used to determine transmit power for a scheduled PUSCH.

Referring back to FIG. 2, the UE transmits a scheduled message to the BS according to a UL grant included in the RAR (step S130).

Now, a UL transmit power in 3GPP LTE will be described with reference to the section 5 of 3GPP TS 36.213 V8.7.0 (2009-05).

A transmit power $P_{PUSCH}(i)$ for PUSCH transmission at a subframe i is defined as follows.

$$P_{PUSCH}(i) = \min\{P_{CMAX}, 10\log_{10}(M_{PUSCH}(i)) + P_{O\_PUSCH}(j) + \alpha(j)PL + \Delta_{TF}(i) + f(i)\} \quad \text{[Equation 1]}$$

Herein, $P_{CMAX}$ denotes a configured UE transmit power, and $M_{PUSCH}(i)$ denotes a bandwidth of a PUSCH resource assignment based on an RB unit. $P_{O\_PUSCH}(j)$ denotes a parameter composed of the sum of a cell-specific element $P_{O\_NOMINAL\_PUSCH}(j)$ and a UE-specific element $P_{O\_UE\_PUSCH}(j)$ which are provided by a higher layer when j=0 and 1. α(j) denotes a parameter provided to the higher layer. PL denotes a downlink path-loss estimation calculated by the UE. $\Delta_{TF}(i)$ denotes a UE-specific parameter. f(i) denotes a UE-specific value derived from TPC. min{A,B} denotes a function for returning a smaller value between A and B.

A transmit power $P_{PUCCH}(i)$ for PUCCH transmission at a subframe i is defined as follows.

$$P_{PUCCH}(i)=\min\{P_{CMAX}, P_{O\_PUCCH}+PL+h(n_{CQI}, n_{HARQ})+\Delta_{F\_PUCCH}(F)+g(i)\}$$ [Equation 2]

Herein, $P_{CMAX}$ and PL are the same as those of Equation 1, and $P_{O\_PUCCH}(j)$ denotes a parameter composed of the sum of a cell-specific element $P_{O\_NOMINAL\_PUCCH}(j)$ and a UE-specific element $P_{O\_UE\_PUCCH}(j)$ which are provided from a higher layer. $h(n_{CQI}, n_{HARQ})$ denotes a value dependent on a PUCCH format. $\Delta_{F\_PUCCH}(F)$ denotes a parameter provided by the higher layer. g(i) denotes a UE-specific value derived from TPC.

A transmit power $P_{SRS}(i)$ for sounding reference signal (SRS) transmission at a subframe i is defined as follows.

$$P_{SRS}(i)=\min\{P_{CMAX}, P_{SRS\_OFFSET}+10\log_{10}(M_{SRS})+P_{O\_PUSCH}(j)+\alpha(j)PL+f(j)\}$$ [Equation 3]

Herein, $P_{CMAX}$, $P_{O\_PUSCH}(j)$, α(j), PL, and f(i) are the same as those of Equation 2, $P_{SRS\_OFFSET}$ denotes a UE-specific parameter provided by a higher layer, and $M_{SRS}$ denotes a bandwidth for SRS transmission.

To regulate the transmit power of the UE for UL transmission, a power headroom (PH) report is used. The PH report is used to provide to the BS with information on a difference between a UE maximum transmit power and an estimated power for the UL transmission.

PH(i) may be defined as follows in a subframe i.

$$PH(i)=P_{CMAX}-\{10\log_{10}(M_{PUSCH}(i))+P_{O\_PUSCH}(j)+\alpha(j)PL+\Delta_{TF}(i)+f(i)\}$$ [Equation 4]

$P_{CMAX}$ denotes a maximum transmit power configured to the UE, and is obtained by applying maximum power reduction (MPR) to a UE's uplink transmit power $P_{EMAX}$ given by a BS. That is, $P_{CMAX} \leq (P_{EMAX}-MPR)$.

The MPR may be a lowest limit value of a maximum output power which is defined to allow the UE to autonomously perform power reduction. The UE can transmit a signal to the BS after autonomously reducing power within a value permitted by the MPR. Since a difference between an average power and a maximum power becomes greater due to a high-order modulation scheme such as 16-QAM and a great number of allocated resource blocks (RBs), the MPR is introduced to overcome low power efficiency caused by the difference and to facilitate a design of a power amplifier of the UE.

According to the section 6.2 of 3GPP TS 36.101 V8.7.0 (2009-09), the MPR based on the modulation scheme and the RB is defined as follows.

TABLE 1

| Modulation Scheme | Channel Bandwidth (RB) | | | | | | MPR (dB) |
|---|---|---|---|---|---|---|---|
| | 1.4 MHz | 3.0 MHz | 5 MHz | 10 MHz | 15 MHz | 20 MHz | |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

The UE subtracts a transmit power to be currently used from a configured maximum transmit power to which the MPR is applied, and thereafter calculates a power headroom by additionally considering other factors such as a path loss. The transmit power to be currently used is calculated by considering a modulation scheme and an RB of an allocated uplink resource.

The UE can reduce a transmit power by randomly applying the MPR according to an implementation of the UE. That is, the BS cannot know an MPR value applied by the UE, which implies that the BS cannot correctly determine a maximum output power of the UE. Therefore, the BS can derive a power amount reduced by the UE according to a transmit power allocated by the BS to the UE on the basis of the power headroom.

Now, a multiple carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or also referred to as bandwidth aggregation or carrier aggregation) supports multiple CCs. For example, if 5 CCs are assigned as a granularity of a carrier unit having a bandwidth of 20MHz, a bandwidth of up to 100MHz can be supported.

One DL CC or a pair of a UL CC and a DL CC can be mapped to one cell. Therefore, when a UE communicates with a BS through multiple CCs, it can be said that the UE receives a service from multiple serving cells.

Figure 4:
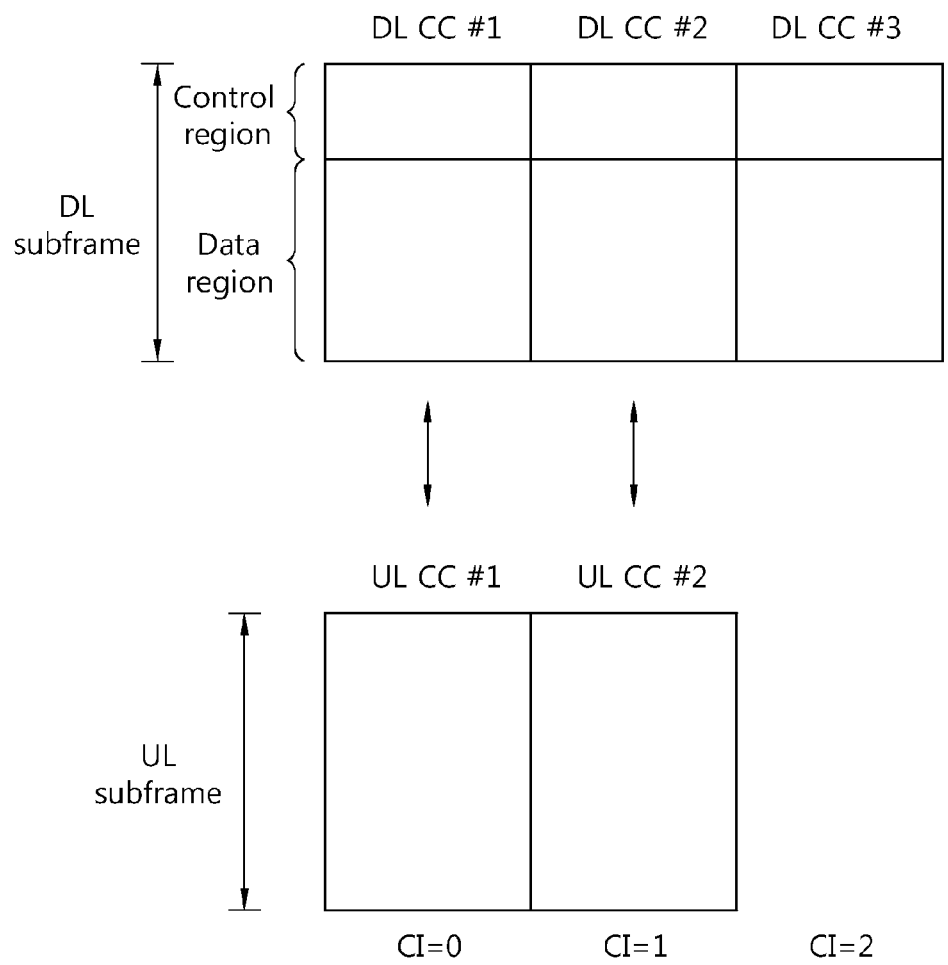
FIG. 4 shows an example of multiple carriers.

FIG. 4 shows an example of multiple carriers.

Although 3 DL CCs and 3 UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since 3 DL CC-UL CC pairs are defined, it can be said that a UE receives a service from 3 serving cells.

The UE may monitor the PDCCH in multiple DL CCs, and may receive a DL transport block simultaneously via the multiple DL CCs. The UE may transmit multiple UL transport blocks simultaneously via multiple UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell (or pcell) and a secondary cell (or scell). The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., RRC messages).

The CI of the primary cell may be fixed. For example, a lowest CI may be designated as a CI of the primary cell. It is assumed hereinafter that the CI of the primary cell is 0 and a CI of the secondary cell is allocated sequentially starting from 1.

The UE may monitor a PDCCH through multiple serving cells. However, even if there are N serving cells, a BS may be configured to monitor the PDCCH for M (M≤N) serving cells. In addition, the BS may be configured to preferentially monitor the PDCCH for L (L≤M≤N) serving cells.

In the conventional 3GPP LTE, even if the UE supports multiple CCs, one timing alignment (TA) value is commonly applied to the multiple CCs. However, a propagation property may change since the multiple CCs are spaced apart from each other to a great extent in a frequency domain. For example, a remote radio header (RRH) and devices may exist in an area of the BS to extend a coverage or to remove a coverage hole.

Figure 5:
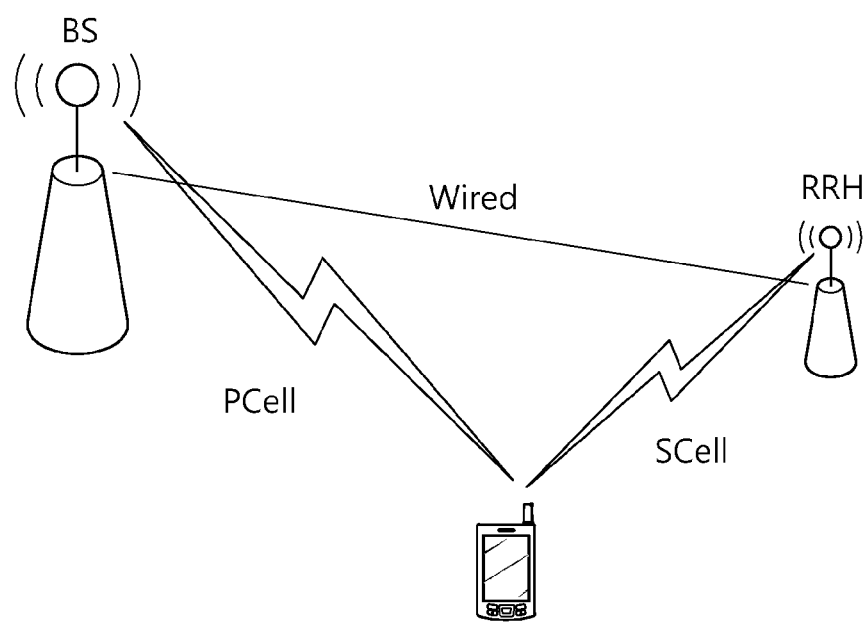
FIG. 5 shows an uplink (UL) propagation difference among multiple cells.

FIG. 5 shows a UL propagation difference among multiple cells.

A UE is served by a primary cell and a secondary cell. The primary cell provides a service by using a BS, and the secondary cell provides a service by using an RRH coupled to the BS. A propagation delay property of the primary cell may be different from a propagation delay property of the secondary cell due to a distance between the BS and the RRH, a processing time of the RRH, etc.

In this case, if the same TA value is applied to the primary cell and the secondary cell, it may have a significant effect on a time alignment of a UL signal.

Figure 6:
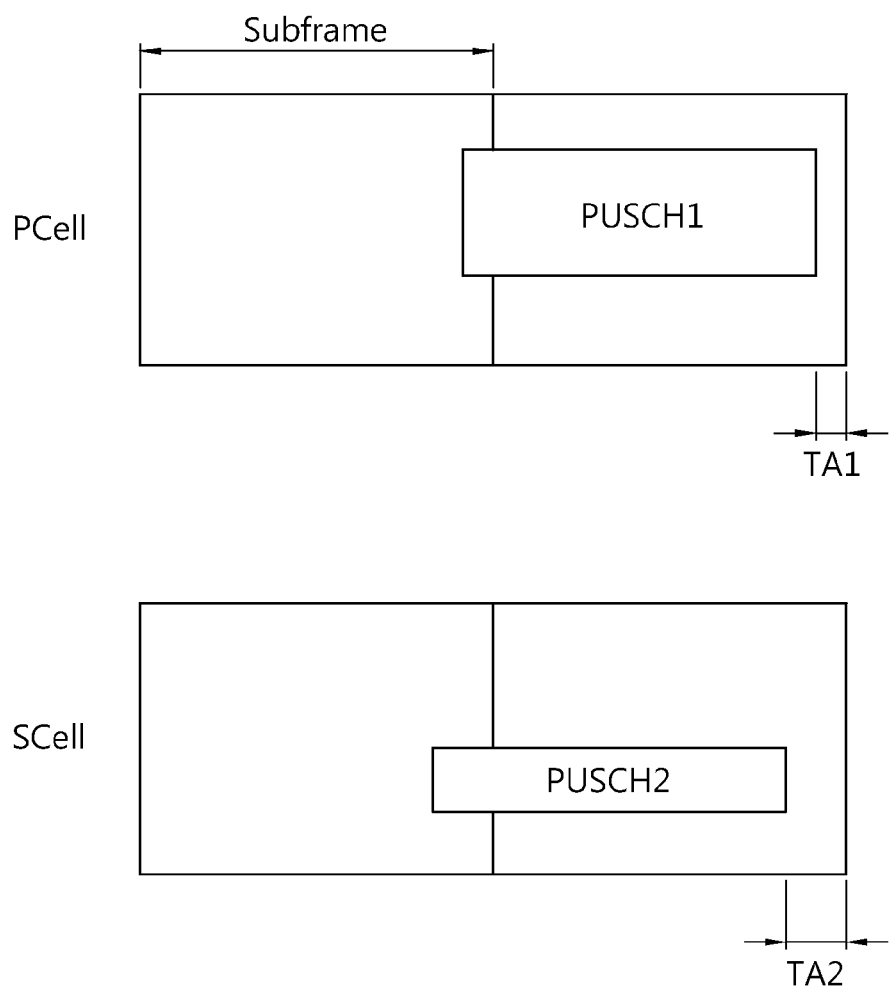
FIG. 6 shows an example in which a timing advance (TA) varies among multiple cells in UL transmission.

FIG. 6 shows an example in which a TA varies among multiple cells in uplink transmission.

An actual TA of a primary cell is 'TA 1', and an actual TA of a secondary TA is 'TA 2'. Therefore, it is necessary to apply an independent TA for each serving cell.

To apply the independent TA, a TA group is defined. The TA group includes one or more cells to which the same TA is applied. The TA is allocated for each TA group, and a time alignment timer runs for each TA group.

Hereinafter, two serving cells, i.e., a first serving cell and a second serving cell, are considered, and it is assumed that the first serving cell belongs to a first TA group, and the second serving cell belongs to a second TA group. The number of serving cells and TA groups are for exemplary purposes only. The first serving cell may be the primary cell or the secondary cell, and the second serving cell may be the primary cell or the secondary cell.

The TA group may include at least one serving cell. Information regarding the configuration of the TA group may be reported by a BS to a UE.

Now, the proposed UL transmit power control will be described.

As a TA varies for each TA group, an ambiguity may occur in the UL transmit power control. In 3GPP LTE, a maximum power total sum $P_{umAx}$ that can be transmitted by the UE for all serving cells in one UL subframe is defined as follows.

$$P_{LCA} \le P_{CMAX} \le P_{HCA}$$ [Equation 5]

Herein, $P_{LCA}$ denotes a minimum value of $P_{CMAX}$, and $P_{HCA}$ denotes a maximum value of $P_{CMAX}$.

As described above, if cells belonging to a plurality of TAG groups are applied to the UE in a multiple carrier system, UL transmission timing for each TA group may vary. As the UL transmission timing varies, it may be difficult to determine $P_{CMAX}$ as shown in Equation 5.

Hereinafter, for convenience of explanation, it is assumed that a cell 1 belongs to a $1^{st}$ TA group, and a cell 2 belongs to a $2^{nd}$ TA group. The number of TA groups is for exemplary purposes only. Although the cell 1 is called a primary cell and the cell 2 is called a secondary cell, both of the cell 1 and the cell 2 may be secondary cells.

In the following embodiment, an MPR is described for example as a parameter used to determine the UL transmit power. However, the parameter used to determine the UL transmit power of PUSCH/PUCCH/SRS may include $P_{CMAX}$, $P_{LCA}$, and/or $P_{HCA}$. For example, the MPR may be replaced with $P_{CMAX}$ in the following embodiment. In this case, a great MPR may be interpreted as a small $P_{CMAX}$, and a small MPR may be interpreted as a great $P_{CMAX}$.

Figure 7:
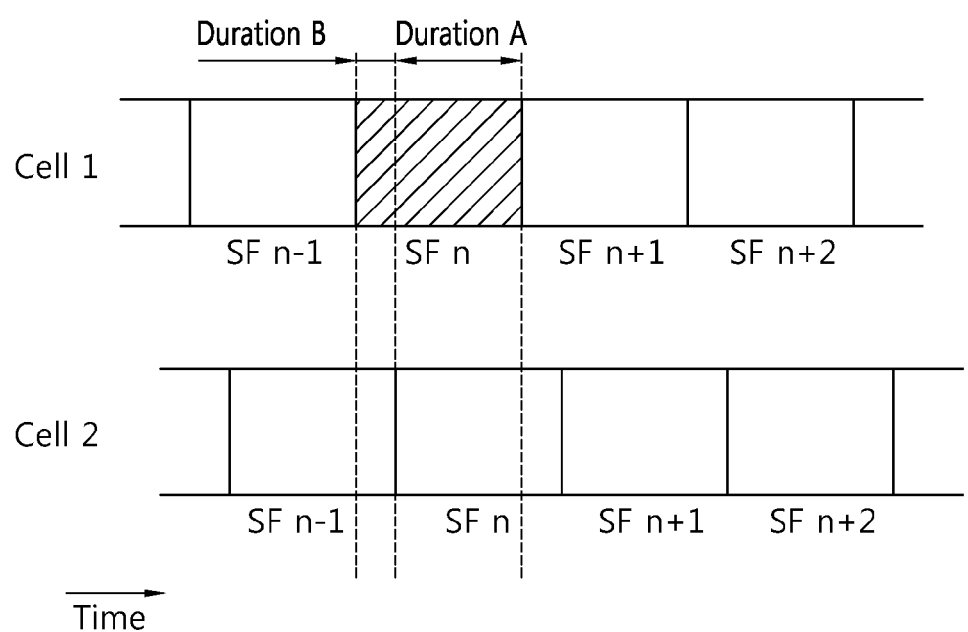
FIG. 7 and FIG. 8 show an example of determining a UL transmit power caused by different UL transmission timing.
Figure 8:
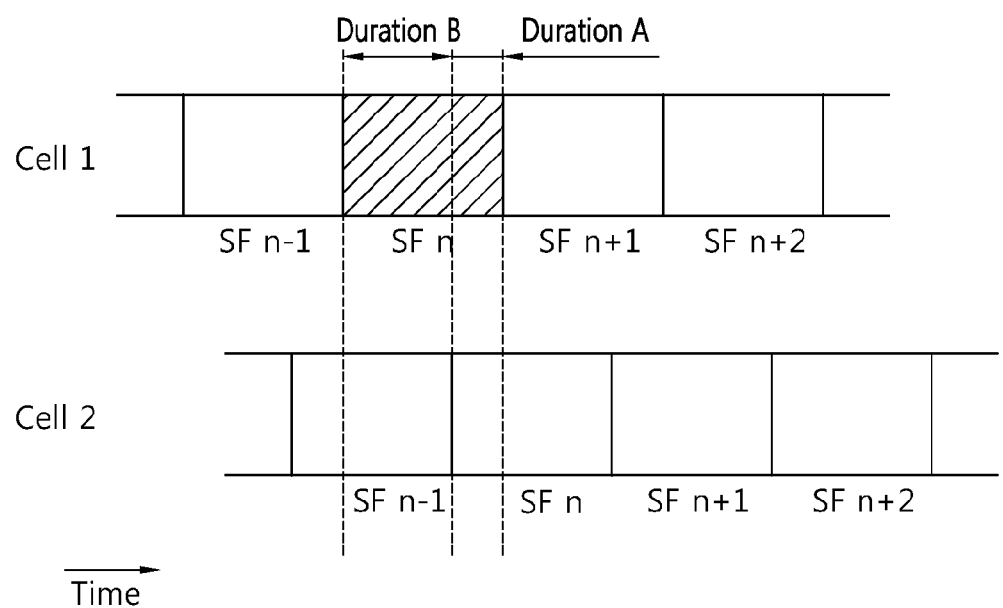

FIG. 7 and FIG. 8 show an example of determining a UL transmit power caused by different UL transmission timing.

In FIG. 7 and FIG. 8, a start of a subframe (SF) n of a cell 1 is more advanced by a duration B than a start of an SF n of a cell 2. A duration A and a duration B in FIG. 7 and FIG. 8 are shown in different sizes. Therefore, the SF n of the cell 1 overlaps by the duration B with an SF n−1 of the cell 2. In this case, in order to determine a maximum transmit power at the SF n, there is a need to determine a specific duration in which an MPR for all cells must be calculated.

In Equation 5 above, $P_{CMAX}$, $P_{LCA}$, and $P_{HCA}$ for one SF are acquired in all cells under the assumption that a start of an SF is identical in all of the cells. Since the start of the SF varies for each cell, the present invention proposes a specific SF on the basis of which the UL transmit power is determined.

It may be considered to apply a separate MPR to each overlapping duration. That is, each MPR for an SF boundary duration is calculated to be applied to $P_{CMAX}$. In the SF n of the cell 1, a different MPR is applied between the duration A and the duration B. By applying this method, $P_{CMAX}$ is not set to be unnecessarily low, and a transmit power of a UE can be avoided from exceeding an expectation value. However, since a maximum transmit power limit of the UE varies in one SF, there is a disadvantage in that a transmit power control is complicated.

In a first embodiment, the UL transmit power may be determined by considering only a transmission aspect for the same SF number.

When calculating an MPR for an SF n, the MPR may be calculated by considering only transmission in an SF n of a cell 1 and an SF n of a cell 2. Therefore, a complexity of a UE's MPR calculation and power control may be decreased. In particular, this method may be effective when a TA difference is not great between cells.

This method may be applied only when a transmission time difference (or a TA difference) among a plurality of cells is less than or equal to a specific threshold. The threshold may be predetermined or may be reported by a BS to the UE.

In a second embodiment, a UL transmit power may be determined by considering a duration in which a corresponding cell overlaps more than a specific cell (or a specific TA group).

When calculating an MPR for an SF n, the MPR is calculated by considering a duration more overlapping than an SF n of a reference cell.

Assume that the cell 1 is a reference cell. In the example of FIG. 8, since an SF n of the cell 1 overlaps with an SF n−1 more than an SF n of a cell 2 (i.e., the duration B is greater in size than the duration A), the MPR in the SF n is determined by considering transmission in the SF n of the cell 1 and the SF n−1 of the cell 2. By applying this method, $P_{CMAX}$ can be prevented from exceeding an expectation value in a wider overlapping duration.

In a third embodiment, one of MPR values for different overlapping durations may be selected according to a specific cell (or a specific TA group). For example, a greatest MPR may be selected from a plurality of MPR values. From a perspective of $P_{CMAX}$, a smallest $P_{CMAX}$ may be selected from a plurality of $P_{CMAX}$. The other way around is also possible.

Regarding the MPR for the SF n, a greatest MPR may be selected among MPRs of portions overlapping with different SFs of other cells with respect to an SF n of a reference cell.

Assume that the cell 1 is a reference cell. In the example of FIG. 8, an MPR1 is obtained in an overlapping duration, i.e., the duration A, and an MPR2 is obtained in the duration B. A greater value between the MPR1 and the MPR2 may be selected and used to determine a UL transmit power. By applying this method, $P_{CMAX}$ can be prevented from exceeding an expectation value in a portion of the overlapping duration.

Although the reference cell is predetermined in the second and third embodiments, it may be reported by the BS to the UE. A primary cell may be defined as the reference cell.

The first to third embodiments can be combined. Alternatively, the embodiments may be applied by being combined with a specific pattern or a specific period. The third embodiment may be applied to a specific cell, and the second embodiment may be applied to other cells.

Figure 9:
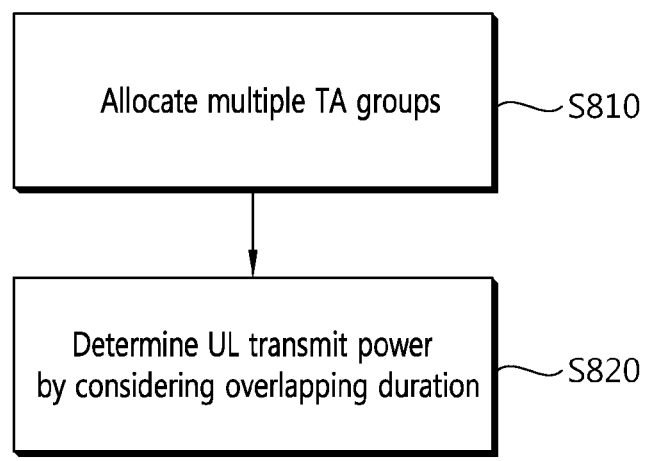
FIG. 9 shows a transmit power control method according to an embodiment of the present invention.

FIG. 9 shows a transmit power control method according to an embodiment of the present invention. This may be performed by a UE.

In step S810, a plurality of TA groups are allocated to the UE by a BS. For example, the UE may receive a configuration regarding a $1^{st}$ TA group and a $2^{nd}$ TA group from the BS.

In step S820, the UE determines a UL transmit power by considering an overlapping duration between the TA groups. The UE may transmit a UL channel on the basis of the determined UL transmit power.

For example, when it is assumed that a cell 1 belongs to the $1^{st}$ TA group and a cell 2 belongs to the $2^{nd}$ TA group, the overlapping duration may include a duration A and a duration B as shown in FIGS. 7 and 8. The UL transmit power may be determined according to one of the aforementioned $1^{st}$ to $3^{rd}$ embodiments or according to a combination of them.

Meanwhile, in a multiple carrier system, a carrier aggregation (CA) can be classified into an inter-band CA and an intra-band CA according to how far CCs are separated relatively on a frequency axis. The inter-band CA uses CCs belonging to different frequency bands, and the intra-band CA uses CCs belonging to the same frequency band. The intra-band CA can be classified into an intra-band contiguous CA which uses adjacent CCs belonging to the same frequency band and an inter-band non-contiguous CA which uses CCs not belonging to the same frequency band.

Figure 10:
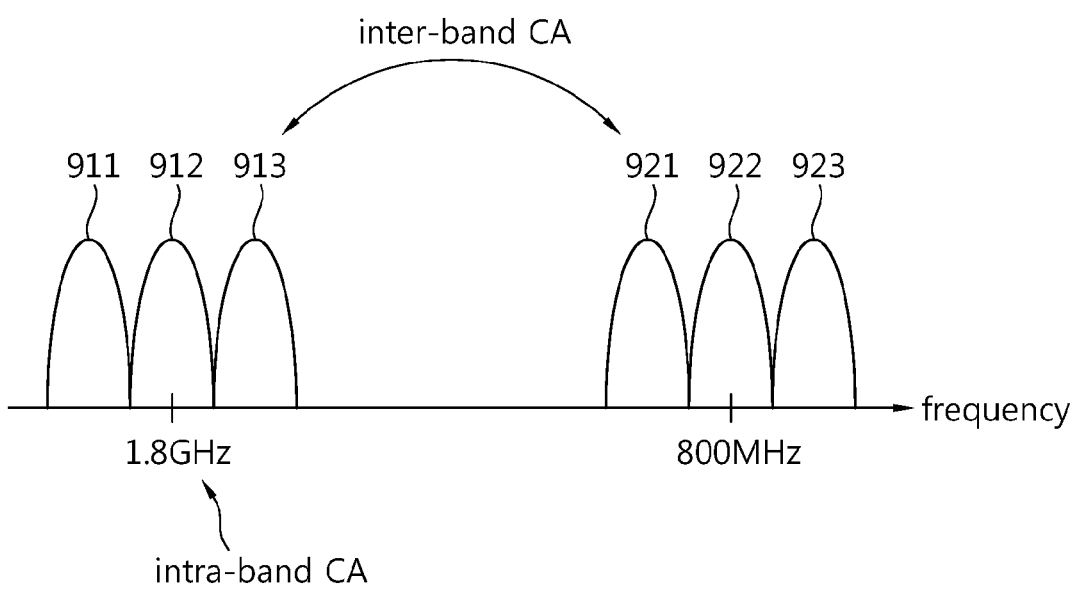
FIG. 10 shows a comparison between an inter-band carrier aggregation (CA) and an intra-band CA.

FIG. 10 shows a comparison between an inter-band CA and an intra-band CA.

It is assumed that a 800 MHz band and a 1.8 GHz band are present, which are separated significantly in a relative sense. Although it is assumed that each frequency band has 3 CCs, this is for exemplary purposes only.

The inter-band CA uses at least one of CCs 911, 912, and 913 of the 1.8 GHz band and at least one of CCs 921, 922, and 923 of the 800 MHz band.

The intra-band CA uses only the CCs 911, 912, and 913 of the 1.8GHz band, or uses only the CCs 921, 922, and 923 of the 800 MHz band.

As described above, a UL maximum transmit power used when the UE which uses a plurality of CCs performs transmission for all cells in one subframe is determined by Equation 5.

In the intra-band, a minimum value $P_{LCA}$ of $P_{CMAX}$ is determined by a function of an MPR value as follows.

$$P_{LCA}=\text{MIN}\{10 \log_{10}\Sigma p_{EMAX,C}-\Delta T_C,$$
$$P_{PowerClass}-\text{MAX}(MPR+A-MPR,P-MPR)-\Delta T_C\} \quad \text{[Equation 6]}$$

Herein, $p_{EMAX,c}$ is a power value given to a serving cell c by a network, $P_{PowerClass}$ is a non-modified UE maximum power, A-MPR is an additional MPR given by the network, P-MPR is a power management term of the UE, and $\Delta Tc$ is a parameter. This is for determining a UL transmit power according to the number of RBs used by the UE having a plurality of serving cells to perform transmission across all of the plurality of serving cells in one subframe.

In comparison therewith, in the inter-band CA, a minimum value $P_{LCA}$ of $P_{CMA}$ is determined as follows.

$$P_{LCA}=\text{MIN}\{10 \log_{10}\Sigma\text{MIN}[p_{EMAX,c}/(\Delta t_{C,c}),$$
$$P_{PowerClass}/(mpr_c \cdot \text{a} -mpr_c\cdot\Delta t_{C,c}\cdot\Delta t_{tB,c})p_{PowerClass}/$$
$$(pmpr_c\cdot\Delta t_{C,c})], P_{PowerClass}\} \quad \text{[Equation 7]}$$

Herein, $\Delta t_{C,c}$, $mpr_c$, a-$mpr_c$, and $pmpr_c$ are parameters specific to a serving cell c. That is, in an inter-band CA, a UL transmit power is determined by considering only a transmission aspect in each serving cell, and a transmission aspect of all serving cells is not considered.

According to the proposed embodiment, if a UE is determined to an inter-band CA and a plurality of serving cells are configured for an intra-band CA within each frequency band, a power parameter (e.g., MPR, A-MPR, etc.) for a plurality of serving cells belonging to each frequency band may be considered when calculating a $P_{CMAX}$ lower-limit $P_{LCA}$ for the inter-band CA.

For example, it is assumed that two serving cells (i.e., a cell 1 and a cell 2) are configured for the UE at a 1.8 GHz band, and one serving cell (i.e., a cell 3) is configured at the 800 MHz band. According to the conventional inter-band CA, a UL transmit power is determined on the basis of a power parameter for each of the cell 1, the cell 2, and the cell 3. According to the proposed invention, the power parameter is determined by considering both of the cell 1 and the cell 2 belonging to the same frequency band. It is assumed that $\Delta t_{C,i}$, mpr a-mpr and pmpr, are acquired as a result thereof. The resultant values may be acquired on the basis of Equation 6 above. Subsequently, the UE may calculate a $P_{CMAX}$ lower-limit $P_{LCA}$ as shown in Equation 7 by using the aforementioned parameter and a power parameter of the cell 3. The proposed method may be applied only to an intra-band contiguous CA in which cells belonging to the same frequency band are contiguous to each other.

The proposed UL transmit power control for the inter-band CA may be applied to the embodiment of FIG. 9. This is a case where a plurality of TA groups are allocated to different frequency bands.

Figure 11:
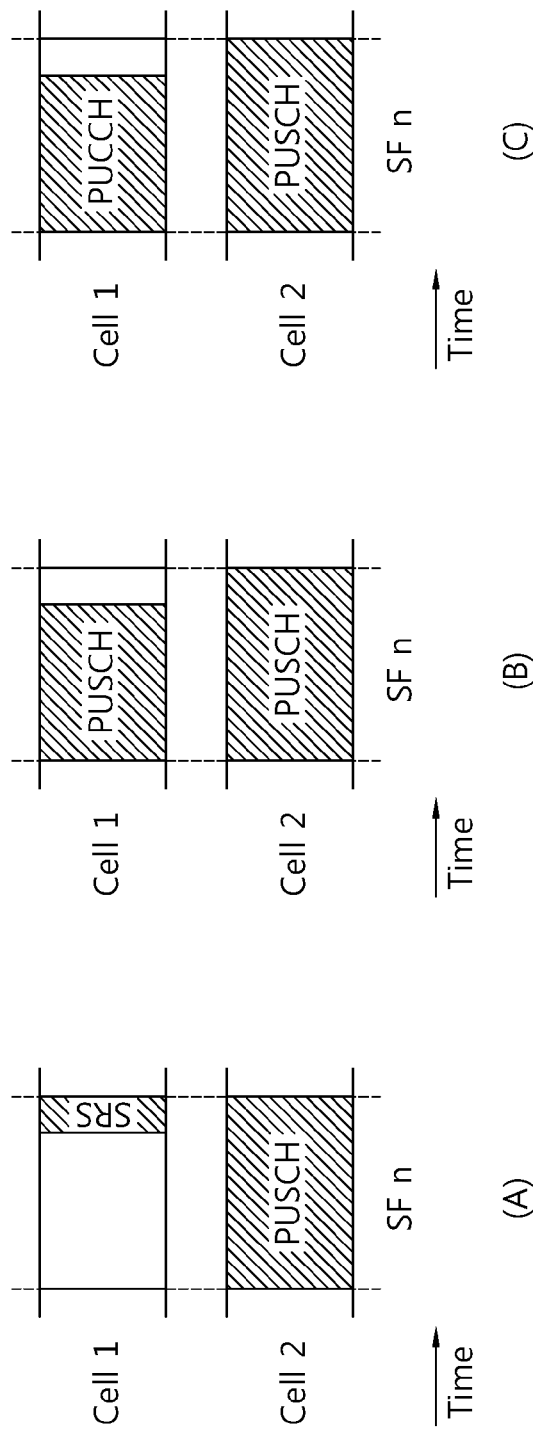
FIG. 11 shows a case where a maximum power reduction (MPR) varies within one subframe in a plurality of serving cells.

FIG. 11 shows a case where an MPR varies within one subframe in a plurality of serving cells. Although it is exemplified that a cell 1 and a cell 2 belong to the same TA group, the cells may also belong to different TA groups.

A subfigure (A) of FIG. 11 shows a case where a UE sends an SRS in an SF n of a cell 1, and transmits a PUSCH in an SF n of a cell 2. Since the SRS is transmitted in a last OFDM symbol of the SF, a difference of an MPR value may be great between the last OFDM symbol of the SF n and the remaining OFDM symbols.

A subfigure (B) of FIG. 11 (B) shows a case where a UE sends a PUSCH in an SF n of a cell 1 and transmits a PUSCH in an SF n of a cell 2, but a last OFDM symbol is punctured in the cell 1. Similarly, a subfigure (C) of FIG. 11 shows a case where a UE sends a PUCCH in an SF n of a cell 1 and transmits a PUSCH in an SF n of a cell 2, but a last OFDM symbol is punctured in the cell 1. A difference of an MPR value may be great between the last OFDM symbol and the remaining OFDM symbols.

As such, an MPR may vary within one SF. A method proposed hereinafter assumes that $1^{st}$ and $2^{nd}$ durations in which the MPR varies are present within an SF, and determines a UL transmit power in the SF. The number of durations in which the MPR varies is for exemplary purposes only.

In a first embodiment, the MPR may be calculated on the basis of a longer duration between the $1^{st}$ and $2^{nd}$ durations. For example, if the $1^{st}$ duration includes the remaining OFDM symbols other than a last OFDM symbol within an SF and the $2^{nd}$ duration includes the last OFDM symbol, the MPR may be determined by considering only a transmission aspect in the $1^{st}$ duration when an SRS and a PUSCH/PUCCH are transmitted simultaneously in a plurality of cells.

In a second embodiment, the MPR may be calculated on the basis of a duration of which an MPR is greater between a $1^{st}$ duration and a $2^{nd}$ duration. A UE may determine a UL transmit power on the basis of a greater MPR between a $1^{st}$ MPR of the $1^{st}$ duration and a $2^{nd}$ MPR of the $2^{nd}$ duration. This has an advantage in that a maximum transmit power of the UE can be prevented from exceeding an expectation value.

In a third embodiment, a different MPR may be applied for each duration. A UE may determine a UL transmit power on the basis of a $1^{st}$ MPR in a $1^{st}$ duration, and may determine the UL transmit power on the basis of a $2^{nd}$ MPR in a $2^{nd}$ duration. Therefore, a transmit power efficiency of the UE can be increased. The UE may report a PH for each duration. Alternatively, the UE may select one of two PHs, and then may report the selected PH.

If a length of a duration is less than or equal to a specific value, the UE may exclude the duration in the MPR calculation. The specific value may be predetermined or may be reported by a BS to the UE. For example, it is assumed that the specific value is 1, and the $2^{nd}$ duration includes last one OFDM symbol. When an SRS and a PUSCH/PUCCH are transmitted simultaneously in a plurality of cells, the UE may determine the MPR by considering only a transmission aspect in the $1^{st}$ duration while excluding the MPR in the $2^{nd}$ duration.

Figure 12:
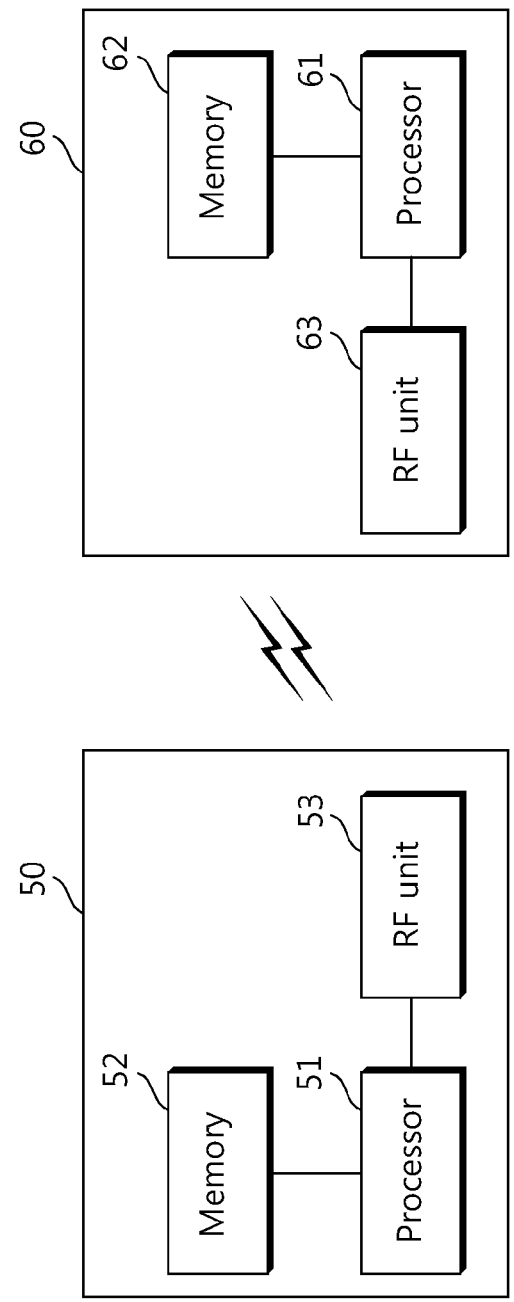
FIG. 12 is a block diagram showing a wireless communication system according to an embodiment of the present invention.

FIG. 12 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, a serving cell and/or a TA group may be controlled/managed by the BS, and an operation of one or more cells may be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedure, and/or methods. In the aforementioned embodiment, an operation of the wireless device for controlling a UL transmit power may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for controlling an uplink transmit power in a wireless communication system, the method comprising:
   determining, by a user equipment, a first maximum power reduction (MPR) for a first duration of a subframe considering a transmission on all of a plurality of serving cells;
   determining, by the user equipment, a second MPR for a second duration of the subframe considering a transmission on all of the plurality of serving cells;
   determining, by the user equipment, an uplink transmit power based on a maximum value of the first MPR and the second MPR; and
   transmitting, by the user equipment, uplink data using the determined uplink transmit power in the subframe.

2. The method of claim 1, wherein the uplink data is transmitted on a Physical Uplink Shared Channel (PUSCH) or a Physical Uplink Control Channel (PUCCH).

3. The method of claim 1, wherein the first duration is not overlapped with the second duration in the subframe.

4. The method of claim 1, wherein the plurality of serving cells are configured as an intra-band carrier aggregation.

5. The method of claim 1, wherein one of the plurality of serving cells is a primary cell.

6. A user equipment for controlling an uplink transmit power in a wireless communication system, the user equipment comprising:
   a radio frequency (RF) unit configured to transmit and receive a radio signal; and
   a processor operatively coupled to the RF unit and configured to:
   determine a first maximum power reduction (MPR) for a first duration of a subframe considering a transmission on all of a plurality of serving cells;
   determine a second MPR for a second duration of the subframe considering a transmission on all of the plurality of serving cells;

determine an uplink transmit power based on a maximum value of the first MPR and the second MPR; and instruct the RF unit to transmit uplink data using the determined uplink transmit power in the subframe.

7. The user equipment of claim 6, wherein the uplink data is transmitted on a Physical Uplink Shared Channel (PUSCH) or a Physical Uplink Control Channel (PUCCH).

8. The user equipment of claim 6, wherein the first duration is not overlapped with the second duration in the subframe.

9. The user equipment of claim 6, wherein the plurality of serving cells are configured as an intra-band carrier aggregation.

10. The user equipment of claim 6, wherein one of the plurality of serving cells is a primary cell.

* * * * *